United States Patent [19]
Keefer et al.

[11] Patent Number: 5,641,954
[45] Date of Patent: Jun. 24, 1997

[54] PROGRAMMABLE DELAY LINE USING LASER DIODE TAPS

[75] Inventors: Christopher W. Keefer, Rome, N.Y.; Michael J. Ward, San Pedro, Calif.; David J. Grucza, Rome, N.Y.

[73] Assignee: The United States of American as represented by the Secretary of the Air Force, Washington, D.C.

[21] Appl. No.: 516,513

[22] Filed: Aug. 17, 1995

Related U.S. Application Data

[63] Continuation of Ser. No. 120,991, Sep. 9, 1993, abandoned.

[51] Int. Cl.⁶ .................................................. G01J 1/04
[52] U.S. Cl. .................... 250/227.12; 359/285; 359/140; 385/7
[58] Field of Search ................. 250/227.12; 359/285, 359/286, 287, 140, 173; 385/7

[56] References Cited

U.S. PATENT DOCUMENTS

| | | | |
|---|---|---|---|
| 4,390,247 | 6/1983 | Freyre | 350/358 |
| 4,671,604 | 6/1987 | Soref | 250/227.12 |
| 4,737,027 | 4/1988 | Maeda | 356/73.1 |
| 5,105,380 | 4/1992 | Owechko | 364/825 |
| 5,111,332 | 5/1992 | Kuwabara et al. | 359/307 |
| 5,146,358 | 9/1992 | Brooks | 359/181 |
| 5,165,104 | 11/1992 | Weverka | 385/7 |
| 5,202,776 | 4/1993 | Gesell | 359/17 |
| 5,220,163 | 6/1993 | Toughlian | 250/201.9 |
| 5,247,388 | 9/1993 | Anderson | 359/287 |
| 5,410,371 | 4/1995 | Lambert | 359/285 |
| 5,412,501 | 5/1995 | Fisli | 359/286 |

FOREIGN PATENT DOCUMENTS 1522249  11/1989  Russian Federation ............... 359/285

*Primary Examiner*—William L. Sikes
*Assistant Examiner*—Tiep H. Nguyen
*Attorney, Agent, or Firm*—Robert L. Nathans

[57] ABSTRACT

A series of taps are created within an acousto-optic cell by imaging an array of LEDs within the cell. The illuminated tap regions are selectively changed by energizing selected LEDs. The electrical input signal produces a travelling acoustic wave within the cell and when the wave crosses illuminated tap regions, electrical output signals are produced having delays proportional to the positions of illuminated LEDs in the array. The magnitude of the output signal is proportional to the LED light intensity which is varied to produce a weighted output signal.

11 Claims, 2 Drawing Sheets

PROGRAMMABLE DELAY LINE USING LASER DIODE TAPS

STATEMENT OF GOVERNMENT INTEREST

This application is a continuation of application Ser. No. 08/120,991, filed Sep. 9, 1993, now abandoned.

The invention described herein may be manufactured and used by or for the Government for governmental purposes without the payment of any royalty thereon.

BACKGROUND OF THE INVENTION

The present invention relates to the field of signal processing.

Signal processing in the general sense, is the manipulation of a signal to achieve a specific purpose. For example, the purpose of signal processing in radar and certain communication systems is to improve the signal-to-noise ratio and reject interference in the process of transforming a specific set of data. The types of processing algorithms include convolution, time and space integrating correlation, matched filtering and data compression. For programmability and accuracy, digital processing techniques are preferred over analog methods. However, for real time signal processing, analog components may be required for computer intensive operations.

Typically, the devices require the capability to operate at the systems intermediate frequency (IF) and have a wide bandwidth capability. The addition of programmability increases the effectiveness of the device to adapt to the system's operating environment.

Many forms of programmable broadband delay lines have been developed for analog signal processing. These include surface acoustic wave devices (SAW), integrated optic devices, fiber optic devices and acoustic charge transport (ACT) devices. The measure of a programmable delay lines performance is a function of the number of taps, the accuracy of tap weights, bandwidth, programming speed and size. The major limitation of SAW devices is the large number required to generate various waveforms. Individual SAW devices are switched in and out as required for the specific filtering operation. The integrated optic and fiber optic approaches provide a relatively short delay line namely 5 nsec/meter of fiber. Thus relatively large amounts of fiber are required for delay lines approaching 5 microseconds. The ACT devices provide wide bandwidth and have speed in a compact package. However the devices are currently limited to a tap accuracy of five bits.

SUMMARY OF AN EMBODIMENT OF THE INVENTION

The electrical input signal to be delayed is applied to an acousto-optic (AO) cell for producing a travelling acoustic wave therein. One or more laser diodes direct light into the AO cell and such light is diffracted when the wave is present at an illuminated portion of the cell. A photodetector produces the delayed output signal having the frequency of the electrical input signal. The delay is proportional to the position of a turned on laser diode with respect to the AO cell. Control means are provided to change the intensity of the light beams to in turn alter the magnitude of the electrical output signal. The number of laser diodes and the output response of the laser diodes determine the number of taps and the tap weight accuracy respectively.

BRIEF DESCRIPTION OF THE DRAWINGS

Various features of the invention will become clearer upon study of the following description, taken in conjunction with the drawings in which.

DETAILED DESCRIPTION OF A PREFERRED EMBODIMENT OF THE INVENTION

Each of the laser diodes L1 through L100 are independently controlled. A variable current source 1 is shown connected to laser diode L1 via switching means 3. Similar current sources are coupled to the remaining 99 laser diodes. This is indicated by lead portion 5. The amount of current fed to each laser determines the amplitude of the tap associated with each laser while the position of each laser in the linear array determines the time delay of the output signal or signals produced at photodetector D1. A tap is thus created by the closure of a switch between an individual laser and a current source.

Figure 1:
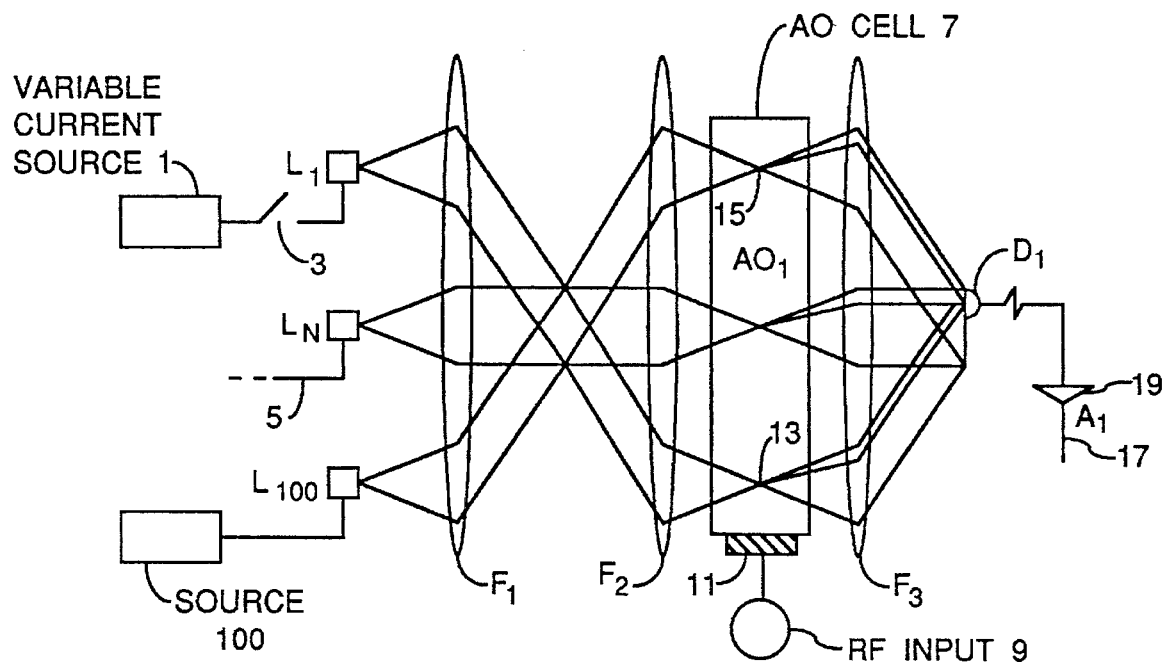
FIG. 1 illustrates a preferred embodiment of the invention.

The linear array is imaged within the AO cell 7 by imaging means comprising lenses F1 and F2. Thus a 100 element laser diode array with laser diode diameters of 25 microns, pitch of 50 microns and divergence of ten degrees would be imaged into the AO cell as shown in FIG. 1. The one to one imaging system would allow the laser beams to expand and then be focused into the AO cell. The input signal source 9 supplies the electrical input signal to be delayed to transducer 11 of the AO cell which responds by generating a travelling acoustic wave having a direction of travel parallel to the linear array of laser diodes. As will be explained in further detail, the acoustic wave produces a diffracted light beam when it intersects light within the AO cell. The diffracted light beam together with undiffracted co-propagating light generates a heterodyne difference signal detected by photodetector means D1. Since its frequency is equal to the carrier frequency of the input signal, the original input signal is recovered and comprises the delayed output signal which is a delayed replica of the input signal. The tap 13 produced by laser L1 would constitute the shortest delay whereas the tap 15 produced by laser diode 100 would constitute the longest delay.

The photodetector D1 is thus a transducer for converting light energy back to electrical energy. Lens F3 comprises a means for directing the diffracted and undiffracted light from any tap directly upon the photodetector as illustrated in FIG. 1. The laser diode control means could comprise a bank of variable current sources 1 which control the weighted magnitude of the electrical output signal, that is as the laser power of a laser increases to increase the light intensity, the magnitude of the electrical output signal increases. The output signal is preferably amplified by amplifier 19. A proof of concept two laser device was built and tested. One laser was stationary and the second laser was mounted on a stage which was movable perpendicular to the optical axis to vary the delay of the output signal. This experimental setup is described in our paper directed to the present invention and entitled "Acousto-optic Programmable Delay Line using Laser Diodes"; Proceedings of the SPIE, the International Society for Optical Engineering, vol. 1790 Analog Photonics, 1992. Hence this device need not be described herein in the interests of brevity and economy.

Figure 2:
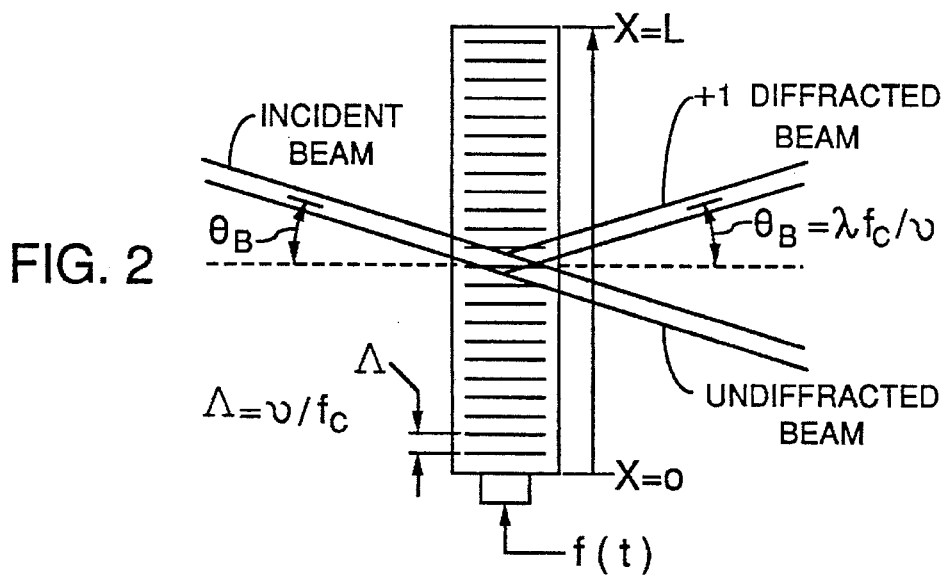
FIG. 2 illustrates certain parameters useful in understanding the invention.
Figure 3:
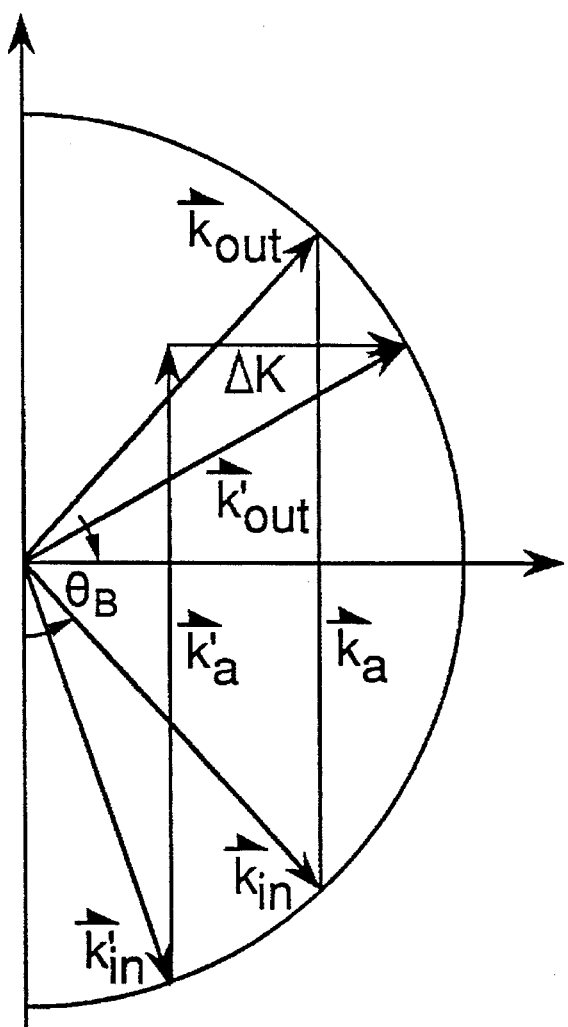
FIG. 3 illustrates a wave vector diagram.

Generation of the diffracted order from the AO cell is an important aspect of the delay line design. The relationship between temporal frequency, acoustic wavelength, and diffraction angle is shown in FIG. 2. For a given carrier frequency $f_c$ the acoustic wavelength is $\Lambda = v/f_c$, where $v$ is acoustic velocity in the AO cell. The diffracted ray angle is related to the temporal frequencies by $\theta_B = \lambda f_c/\upsilon$. The momentum conservation laws between the collision of photons and phonons provides a model for explaining Bragg diffraction. In FIG. 3 the wave vector $k_{out}$ of the diffracted light beam is equal to the vector sum of the $k_{in}$ of the incident light beam and $k_a$ of the acoustic wave. Allow $\Delta K$ to be the momentum mismatch between $k_{in}$ and $k_a$. The ratio of diffracted light intensity, $I_1$, to incident light intensity, $I_o$, can be represented as $$\frac{I_1}{I_0} = \eta \, \text{SINC}[\eta + (\Delta K^* L/2)^2]^{1/2} \qquad (1)$$

where $\eta$ is an efficiency parameter. Hence, the maximum value for $I_1/I_o$ occurs when $\Delta K=0$. From FIG. 3 we see that $\Delta K=0$ when $k_{out}=k_{in}+k_a$. This wave matching condition defines the optimum illumination angle, the Bragg angle $\theta_B$, for light incident onto the AO delay line. Referring to FIG. 3, a change in the angle of incident light from $k_{in}$ to $k'_{in}$, results in a non-zero value for $\Delta K$, and a decrease in diffracted light intensity.

Figure 4:
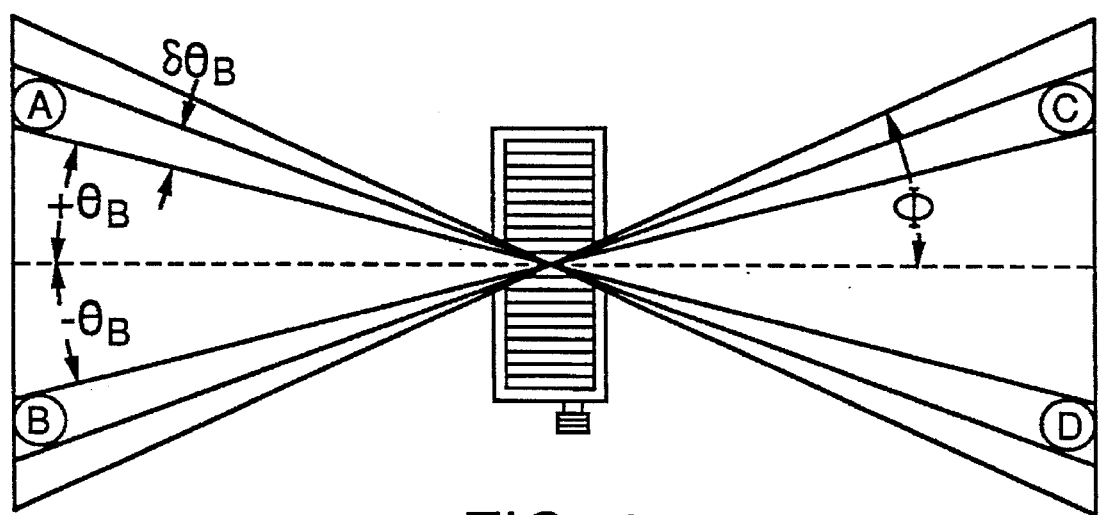
FIG. 4 illustrates acousto-optic interaction for a focused beam of light.

FIG. 4 depicts a Gaussian beam sharply focused into an AO cell. There is only a small range of angles $\sigma\theta_B$, about $\pm\theta_B$, for which effective diffraction occurs. Note that if the focusing angle, $\phi$, is larger than $\theta_B$, the diffracted light will be co-propagating with a portion of the undiffracted beam. A photodetector at position C in FIG. 4 collects the +1 diffracted light originally incident from position A, and the co-propagating undiffracted light originating from position B. The diffracted light incident onto the detector will contain a doppler frequency shift equal to $f_c$ caused by the input signal f(t) to the AO cell. The heterodyning of the undiffracted and diffracted light at the detector provides a frequency downconversion from the laser frequency and returns the signal f(t).

The marriage of the relatively new technology of microlaser diode arrays with the mature AO technology is the main feature of the proposed programmable delay line device. The system can function as a wideband programmable filter and generate various waveforms for a given input signal. The number of laser diodes determines the number of taps and is limited only by the size and spacing of the lasers. The results of our experimental set-up show that the concept of a programmable delay line using laser diodes can generate accurate multiple time delays of an input signal. The system also demonstrates uniform response over a 4.0 μsec delay aperture and 30 dB dynamic range of RF output level versus input laser power. While digital processors are limited in bandwidth and speed, and other analog processors are limited in accuracy and reconfigurability, the proposed design overcomes these limitations. The system uses many of the same components employed in optical spectrum analyzers. This now allows for an integrated optical signal processing system for application to radar, communication and electronic warfare.

The system described here uses a single channel AO cell and a one-dimensional laser diode array to form the programmable delay line. The use of a multichannel AO cell and the MxN laser diode array, where M is the number of AO channels and N is the number of taps, would capitalize on the parallel nature of optics. Different signals could be input into each of the AO channels and various amplitude and time delayed versions of each could be collected at a common detector. The overall size of the system would increase only slightly in the vertical direction as the acoustic channels could be closely spaced. However, the overall processing capability of such a device would increase by the Mth power. A ten channel device suggests a 1000 times improvement in processing capability.

While preferred embodiments of the present invention have been described, numerous variations will be apparent to the skilled worker in the art, and thus the scope of the invention is to be restricted only by the terms of the following claims and art recognized equivalents thereof.

What is claimed is:

1. A programmable tapped delay line comprising:
   (a) an array of multiple light beam sources;
   (b) an acousto-optic cell;
   (c) coupling means for optically coupling said light beam sources to said acousto-optic cell;
   (d) signal input means for inputting a signal into said acousto-optic cell which produces a travelling acoustical wave propagating therein;
   (e) light beam source variable beam intensity control means for turning on selected light beam sources for in turn producing a set of only +1 diffracted beams within an undiffracted beam at positions along said acousto-optic cell corresponding to those light beam sources which are turned on;
   (f) photodetector means for converting light into electrical pulses; and
   (g) optical means for projecting said set of diffracted beams along with overlapping portions of the undiffracted beam upon said photodetector means.

2. The delay line of claim 1 wherein said coupling means comprises means for imaging said array of multiple light beam sources within said acousto-optic cell.

3. The delay line of claim 2 wherein said acousto-optic cell is positioned parallel to said array of light beam sources.

4. The delay line of claim 3 wherein said photodetector means consists of a single photodetector.

5. The delay line of claim 3 wherein said light beam source control means alters intensities of individual light beams produced by turned on light beam sources.

6. The delay line of claim 1 wherein said acousto-optic cell is positioned parallel to said array of light beam sources.

7. The delay line of claim 6 wherein said light beam source control means alters intensities of individual light beams produced by turned on light beam sources.

8. The delay line of claim 1 wherein said photodetector means consists of a single photodetector.

9. The delay line of claim 1 wherein said light beam source control means alters intensities of individual light beams produced by turned on light beam sources.

10. A programmable tapped delay line comprising:
    (a) a linear array of at least several light beam sources;
    (b) an acousto-optic cell;
    (c) imaging means for imaging said linear array into said acousto-optic cell;
    (d) signal input means for inputting a single signal into a terminal portion of said acousto-optic cell which produces a travelling acoustical wave therein, propagating in a direction parallel to said linear array;
    (e) light beam source variable beam intensity control means for turning on selected light beam sources for in turn producing a set of only +1 diffracted beams within an undiffracted beam at positions along said acousto-optic cell corresponding to those light beam sources which are turned on;
    (f) photodetector means for converting light into electrical pulses; and
    (g) optical means for projecting said set of diffractive beams along with overlapping portions of the undiffracted beam upon said single photodetector.

11. The delay line of claim 10 wherein said photodetector means consists of a single photodetector.

* * * * *